US011350728B1

(12) United States Patent
Shen

(10) Patent No.: US 11,350,728 B1
(45) Date of Patent: Jun. 7, 2022

(54) CONNECTOR FOR MOUNTING TOOTHBRUSH HEAD AND ELECTRIC TOOTHBRUSH HANDLE OF ELECTRIC TOOTHBRUSH

(71) Applicant: Huabiao Shen, Gaozhou (CN)

(72) Inventor: Huabiao Shen, Gaozhou (CN)

( * ) Notice: Subject to any disclaimer, the term of this patent is extended or adjusted under 35 U.S.C. 154(b) by 0 days.

(21) Appl. No.: 17/557,136

(22) Filed: Dec. 21, 2021

(51) Int. Cl.
*A46B 5/00* (2006.01)
*A46B 13/02* (2006.01)
*A46B 9/04* (2006.01)

(52) U.S. Cl.
CPC .............. *A46B 5/0095* (2013.01); *A46B 9/04* (2013.01); *A46B 13/023* (2013.01); *A46B 2200/1066* (2013.01)

(58) Field of Classification Search
CPC ......... A46B 5/0095; A46B 9/04; A46B 13/02; A46B 13/023; A46B 2200/1066; A46B 3/08; A61C 17/222
See application file for complete search history.

(56) References Cited

U.S. PATENT DOCUMENTS

| | | | |
|---|---|---|---|
| 10,912,377 B1 * | 2/2021 | Kuang | A61C 17/3481 |
| 11,071,612 B1 * | 7/2021 | Zhou | A46B 9/04 |
| 11,096,768 B1 * | 8/2021 | Lin | A61C 17/222 |
| 2010/0043156 A1 * | 2/2010 | Kressner | A61C 17/222 15/22.1 |
| 2014/0143964 A1 * | 5/2014 | Fattori | A61C 17/3481 15/22.1 |
| 2015/0245895 A1 * | 9/2015 | Kressner | A61C 17/225 15/22.1 |
| 2015/0257862 A1 * | 9/2015 | Dishon | A61C 17/3436 15/167.1 |
| 2019/0174909 A1 * | 6/2019 | Huang | F16D 1/05 |
| 2020/0085178 A1 * | 3/2020 | Van Den Ende | A61C 1/142 |
| 2021/0100346 A1 * | 4/2021 | Dishon | A46B 5/0095 |
| 2021/0322141 A1 * | 10/2021 | He | A61C 17/222 |
| 2022/0000253 A1 * | 1/2022 | Huang | A46B 13/023 |
| 2022/0039932 A1 * | 2/2022 | Kuang | A61C 17/222 |

* cited by examiner

*Primary Examiner* — Weilun Lo
(74) *Attorney, Agent, or Firm* — Rumit Ranjit Kanakia

(57) ABSTRACT

A connector for an electric toothbrush to mount a toothbrush head with an electric toothbrush handle of the electric toothbrush is provided. The connector includes a body configured to be received in an opening of the toothbrush head. The body includes a first section, a second section, and a third section extending one above the other, and includes a seating profile, an aperture, and a biasing member. The seating profile is defined at adjoining of the second and third sections. The aperture is formed inside of the body to receive a drive shaft of the electric toothbrush handle. Further, the biasing member is received along the third section and rests on the seating profile, and operatively coordinates with a threaded profile and a flexible profile of the third section to facilitates snugly coupling of the toothbrush head with the electric toothbrush handle of the electric toothbrush.

20 Claims, 3 Drawing Sheets

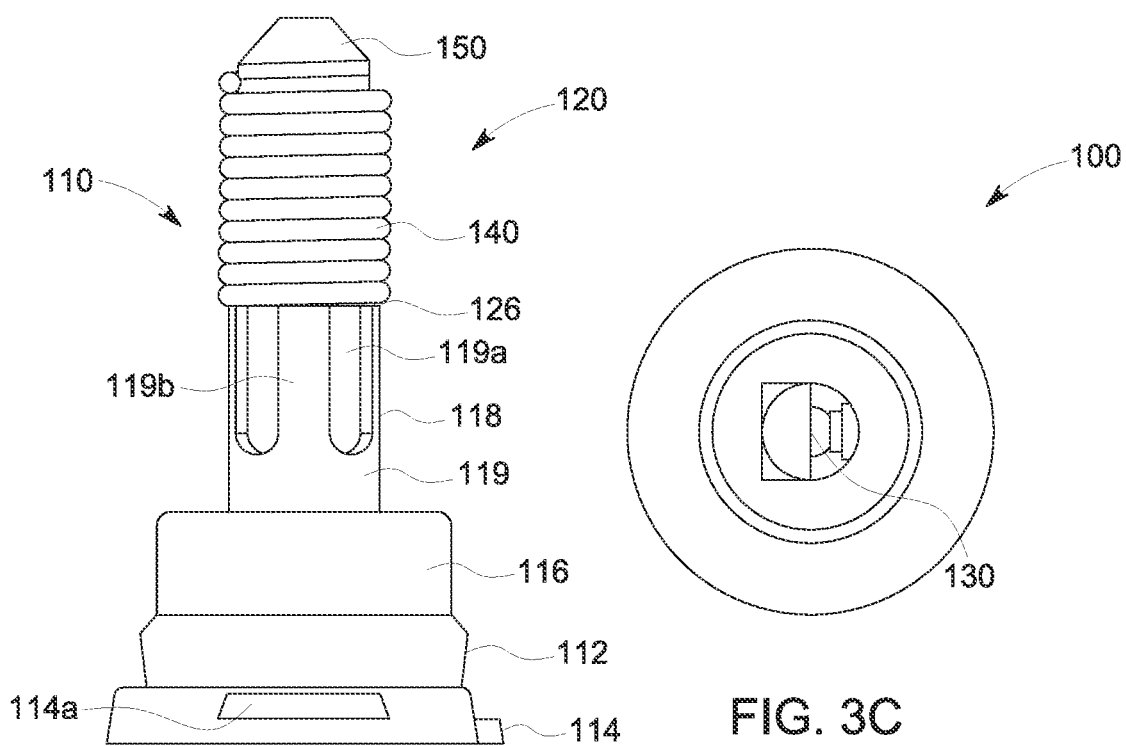
FIG. 3A
FIG. 3C
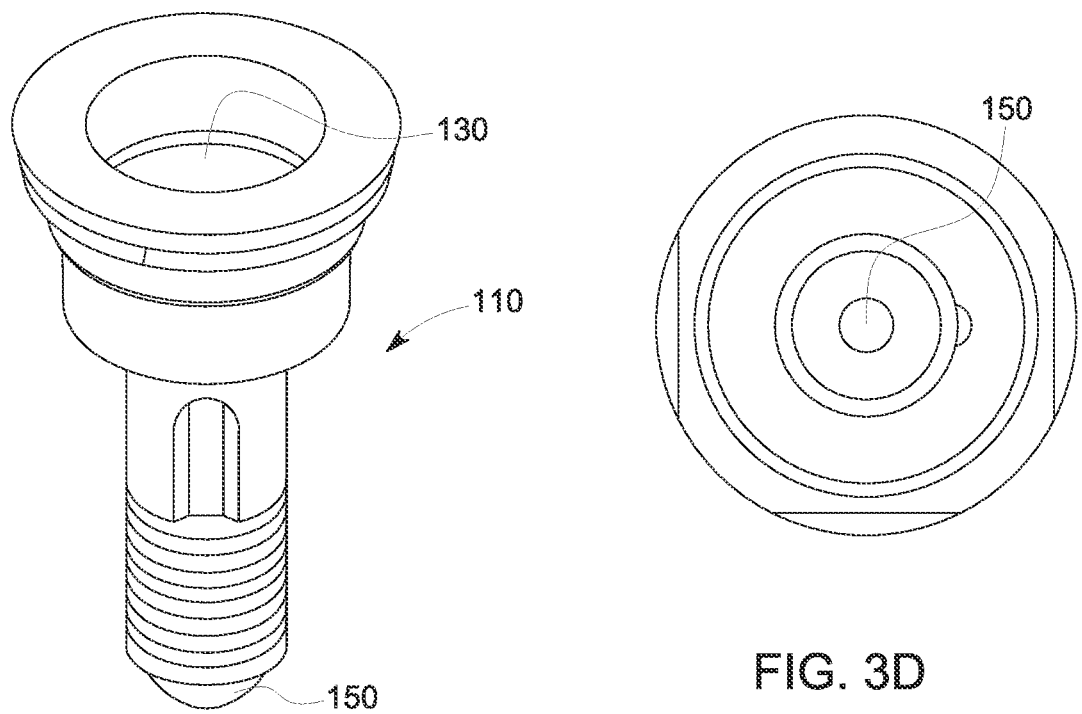
FIG. 3B
FIG. 3D

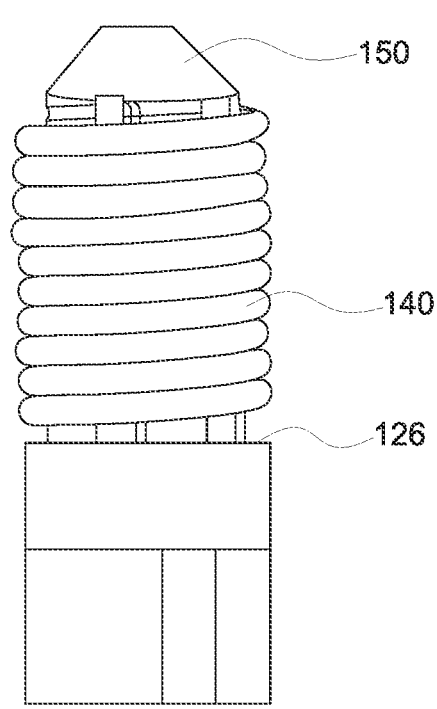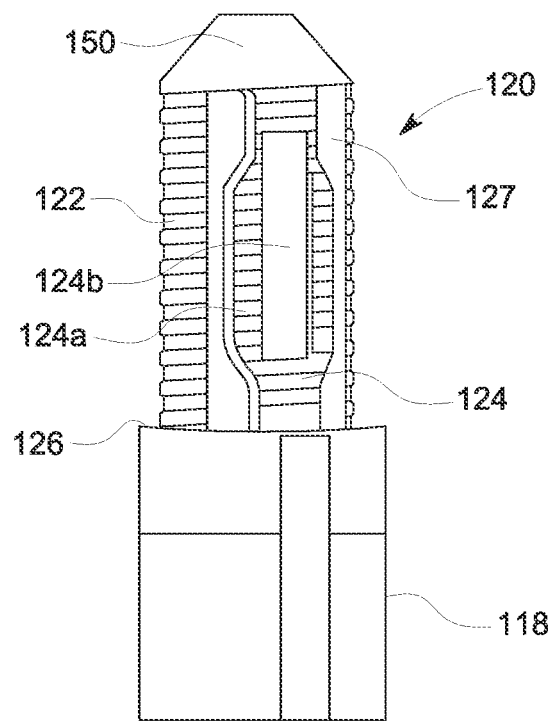
FIG. 4A  FIG. 4B
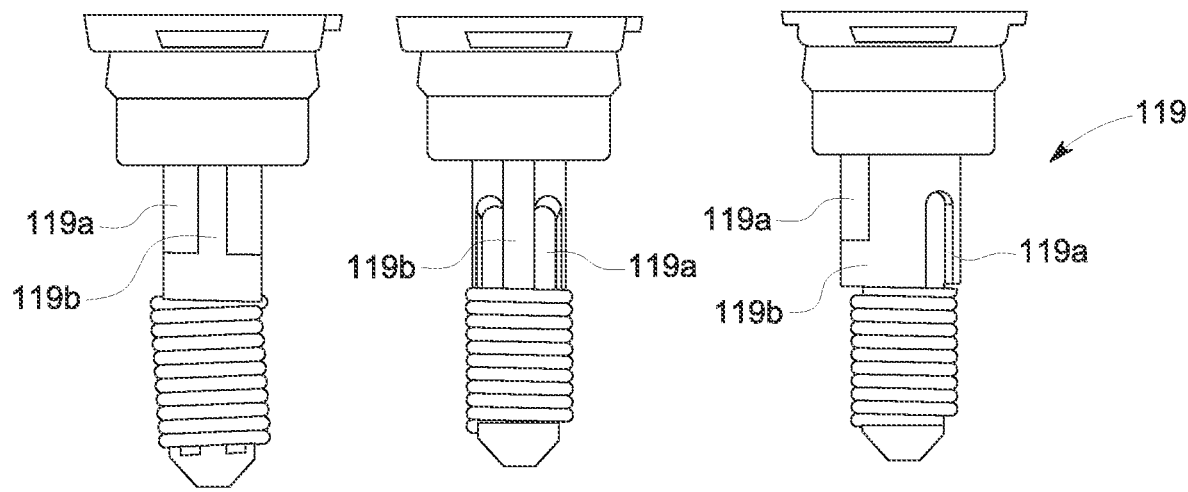
FIG. 5A  FIG. 5B  FIG. 5C

CONNECTOR FOR MOUNTING TOOTHBRUSH HEAD AND ELECTRIC TOOTHBRUSH HANDLE OF ELECTRIC TOOTHBRUSH

FIELD OF THE DISCLOSURE

The present disclosure relates to an electric toothbrush, and, more particularly, to a connector for an electric toothbrush to mount a toothbrush head with an electric toothbrush handle of the electric toothbrush.

BACKGROUND OF THE DISCLOSURE

Electric toothbrush may essentially include a toothbrush head and an electric toothbrush handle. Both of these essential parts, i.e., the toothbrush head and the electric toothbrush handle are generally coupled via a suitable connector, which gives a flexibility to replace either of the toothbrush head or the electric toothbrush handle, whenever required by a user. Additionally, such connectors should be able to provide proper and sturdy connection between the toothbrush head and the electric toothbrush handle as many types of electric toothbrushes use high speed vibrations of the motor inside the toothbrush handle to drive the brush head having the bristles. In order to operate such electric toothbrush, the construction of the brush head requires that it be tightly coupled to the drive shaft of the toothbrush handle so it can withstand the high-speed vibrations from operating the toothbrush.

Many existing products use various kinds of connectors, however, may not be suitable from a perspective of one or other reasons, such as cost involved in manufacturing due to various number parts, types of materials, and so forth.

Accordingly, there exists a need to overcome shortcomings of the conventional connectors, such as to have a connector with minimal parts and be cost effective. Further, there is need of such connectors that may be capable of withstanding high-speed vibrations from operating the toothbrush.

SUMMARY OF THE DISCLOSURE

In view of the foregoing disadvantages inherent in the prior art, the general purpose of the present disclosure is to provide a connector for an electric toothbrush to mount a toothbrush head with an electric toothbrush handle of the electric toothbrush, to include all advantages of the prior art, and to overcome the drawbacks inherent in the prior art.

An object of the present disclosure is to provide a connector with minimal parts and be cost effective.

An object of the present disclosure is to provide a connector that may be capable of withstanding high-speed vibrations from operating the toothbrush.

In light of the above objects, in one aspect of the present disclosure, a connector for an electric toothbrush to mount a toothbrush head with an electric toothbrush handle of the electric toothbrush is provided. The connector includes a body configured to be received in an opening of the toothbrush head. The body includes a first section, a second section, and a third section. The first section includes a flange portion and a stepped circular profile. The flange portion extends diametrically, and the stepped circular profile extends diametrically and longitudinally. Further, the second section extends from the first section. The second section includes an alternating profile arranged across the second section. Furthermore, the third section extends from the second section. The third section includes a threaded profile, a flexible profile, and longitudinal cutouts that separates the flexible profile from the threaded profile. The connector further includes a seating profile, an aperture, and a biasing member. The seating profile is defined at adjoining of the second section and the third section. The aperture is formed inside of the body and extends from the first section to the third section. The aperture is configured to receive a drive shaft of the electric toothbrush handle. Further, the biasing member is received along the third section and rests on the seating profile. The biasing member operatively coordinates with the threaded profile and the flexible profile to be diametrically adjusted as per the profiles of the opening of the toothbrush head and the drive shaft of the electric toothbrush handle to snugly couple the toothbrush head with the electric toothbrush handle of the electric toothbrush.

In one embodiment, the flange portion includes at least one receptacle configured to be engaged with a complementary ridge formed along of the opening of the toothbrush head.

In one embodiment, the alternating profile of the second section includes a plurality of alternating slots and ridges formed across a portion of the second section.

In one embodiment, the plurality of alternating slots and ridges are formed in one of a zig-zag pattern or a side-by-side pattern.

In one embodiment, the threaded profile includes threads formed across the third section.

In one embodiment, the flexible profile includes a flexible member and a rib. The flexible member extends from the seating profile, and the rib is formed along a portion of the flexible member.

In one embodiment, each of the first section, the second section and the third section include a diametric profile, and in that the diametric profile of the first section is greater than the second section, and the diametric profile of the second section is greater than the third section.

In one embodiment, the aperture includes a diameter that reduces along the length extending from the first section to the third section.

In one embodiment, the biasing member is a coil spring where each coil is accommodated in respective threads of the threaded profile.

In one embodiment, the connector further includes an apex member above the third section.

In one another aspect of the present disclosure, a toothbrush head for coupling with an electric toothbrush handle of an electric toothbrush is provided. The toothbrush head includes a brush section having a plurality of bristles; a stem section extending from the brush section, wherein the stem section includes an opening. The toothbrush head further includes a connector. The connector includes a body configured to be received in the opening of the toothbrush head. The body includes a first section, a second section, and a third section. The first section includes a flange portion and a stepped circular profile. The flange portion extends diametrically, and the stepped circular profile extends diametrically and longitudinally. Further, the second section extends from the first section. The second section includes an alternating profile arranged across the second section. Furthermore, the third section extends from the second section. The third section includes a threaded profile, a flexible profile, and longitudinal cutouts that separates the flexible profile from the threaded profile. The connector further includes a seating profile, an aperture, and a biasing member. The seating profile is defined at adjoining of the second section and the third section. The aperture is formed inside of the body and extends from the first section to the third section. The aperture is configured to receive a drive shaft of the electric toothbrush handle. Further, the biasing member is received along the third section and rests on the seating profile. The biasing member operatively coordinates with the threaded profile and the flexible profile to be diametrically adjusted as per the profiles of the opening of the toothbrush head and the drive shaft of the electric toothbrush handle to snugly couple the toothbrush head with the electric toothbrush handle of the electric toothbrush.

In one embodiment, the toothbrush head further includes a complementary ridge formed along of the opening of the toothbrush head. The flange portion includes at least one receptacle configured to be engaged with the complementary ridge.

In yet one another aspect of the present disclosure, an electric toothbrush is provided. The electric toothbrush includes a toothbrush head, an electric toothbrush handle, and a connector. The toothbrush head includes a brush section, and a stem section extending from the brush section. The brush section includes a plurality of bristles, and the stem section includes an opening. Further, the electric toothbrush handle includes a drive shaft. Furthermore, the connector includes a body configured to be received in the opening of the toothbrush head. The body includes a first section, a second section, and a third section. The first section includes a flange portion and a stepped circular profile. The flange portion extends diametrically, and the stepped circular profile extends diametrically and longitudinally. Further, the second section extends from the first section. The second section includes an alternating profile arranged across the second section. Furthermore, the third section extends from the second section. The third section includes a threaded profile, a flexible profile, and longitudinal cutouts that separates the flexible profile from the threaded profile. The connector further includes a seating profile, an aperture, and a biasing member. The seating profile is defined at adjoining of the second section and the third section. The aperture is formed inside of the body and extends from the first section to the third section. The aperture is configured to receive the drive shaft of the electric toothbrush handle. Further, the biasing member is received along the third section and rests on the seating profile. The biasing member operatively coordinates with the threaded profile and the flexible profile to be diametrically adjusted as per the profiles of the opening of the toothbrush head and the drive shaft of the electric toothbrush handle to snugly couple the toothbrush head with the electric toothbrush handle of the electric toothbrush.

In one embodiment, the electric toothbrush further includes a complementary ridge formed along of the opening of the toothbrush head. The flange portion has at least one receptacle configured to be engaged with the complementary ridge.

In one embodiment, the aperture includes a diameter that reduces along the length extending from the first section to the third section to receive the drive shaft.

This together with the other aspects of the present disclosure, along with the various features of novelty that characterize the present disclosure, is pointed out with particularity in the claims annexed hereto and forms a part of the present disclosure. For a better understanding of the present disclosure, its operating advantages, and the specified object attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description taken in conjunction with the accompanying drawing, in which:

FIG. 3A illustrates a perspective view of a connector, in accordance with an exemplary embodiment of the present disclosure;

FIG. 3B illustrates an inverted perspective view of the connector of FIG. 3A, in accordance with an exemplary embodiment of the present disclosure;

FIGS. 3C and 3D, respectively, illustrates top and bottom views of the connector of FIG. 3A, in accordance with an exemplary embodiment of the present disclosure;

FIGS. 4A and 4B, respectively, illustrates enlarged views of a third section of the connector of FIG. 3A with and without biasing member, in accordance with an exemplary embodiment of the present disclosure; and FIGS. 5A, 5B and 5C illustrate a plurality of alternating slots and ridges formed in one of a zig-zag pattern or a side-by-side pattern, in accordance with an exemplary embodiment of the present disclosure.

Like reference numerals refer to like parts throughout the description of several views of the drawing.

DETAILED DESCRIPTION OF THE DISCLOSURE

The exemplary embodiments described herein detail for illustrative purposes are subject to many variations in implementation. The present disclosure provides a connector for an electric toothbrush to mount a toothbrush head with an electric toothbrush handle of the electric toothbrush. It should be emphasized, however, that the present disclosure is not limited only to what is disclosed and extends to cover various alternation to the connector for the electric toothbrush to mount the toothbrush head with the electric toothbrush handle of the electric toothbrush. It is understood that various omissions and substitutions of equivalents are contemplated as circumstances may suggest or render expedient, but these are intended to cover the application or implementation without departing from the spirit or scope of the present disclosure.

The terms "a" and "an" herein do not denote a limitation of quantity, but rather denote the presence of at least one of the referenced items.

The terms "having", "comprising", "including", and variations thereof signify the presence of a component.

Figure 1:
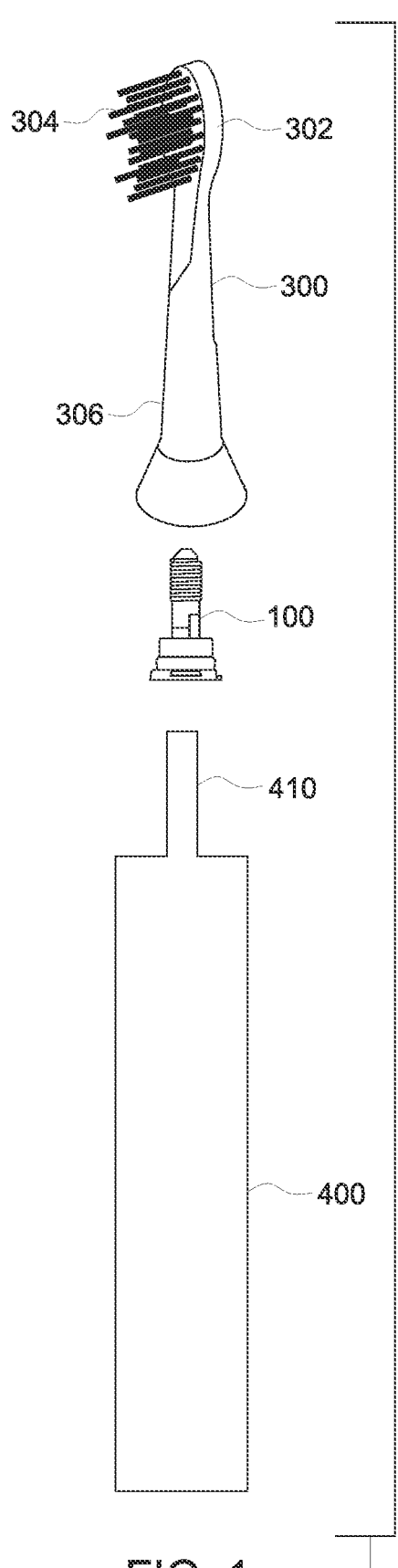
FIG. 1 illustrates an exploded view of an electric toothbrush depicting a connector, a toothbrush head and an electric toothbrush handle, in accordance with an exemplary embodiment of the present disclosure.
Figure 2:
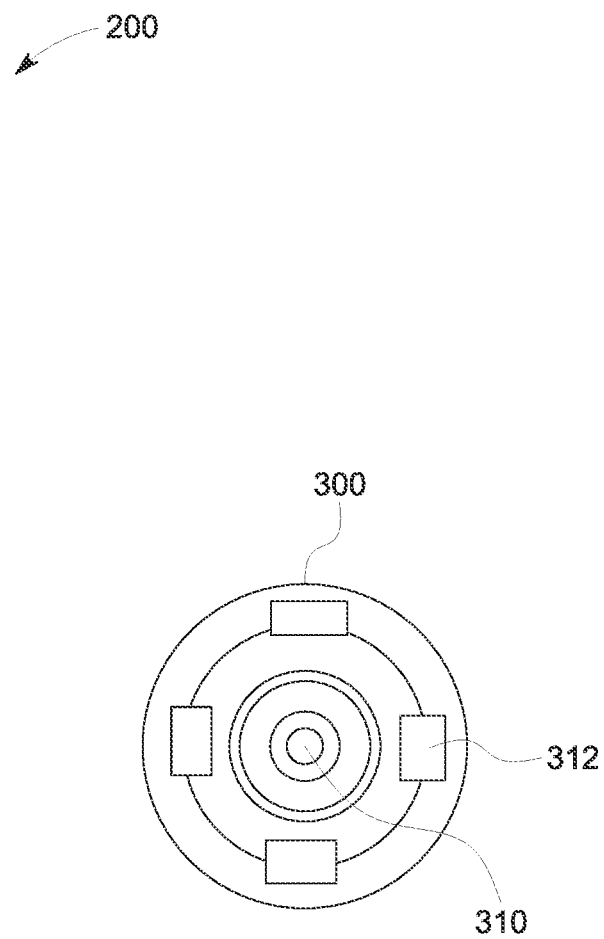
FIG. 2 illustrates a bottom view of the toothbrush head of the electric toothbrush of FIG. 1, in accordance with an exemplary embodiment of the present disclosure.

Referring now to FIGS. 1 to 5C, a connector 100 for an electric toothbrush 200 to mount a toothbrush head 300 with an electric toothbrush handle 400 of the electric toothbrush 200 will now be described, in accordance with an exemplary embodiment of the present disclosure. Specifically, FIG. 1 illustrates an exploded view of an electric toothbrush 200 depicting the connector 100, the toothbrush head 300 and the electric toothbrush handle 400, and FIG. 2 illustrates a bottom view of the toothbrush head 300 of the electric toothbrush 200 of FIG. 1. As shown in FIG. 1, the toothbrush head 300 includes a brush section 302 having a plurality of bristles 304. the toothbrush head 300 further includes a stem section 306 extending from the brush section 302. The stem section 306 includes an opening 310, and a complementary ridge 312 formed along of the opening 310 of the toothbrush head 300, and will be described herein later. Furthermore, the electric toothbrush handle 400 includes a drive shaft 410. The electric toothbrush handle 400 via the connector 100 is coupled to the toothbrush head 300, and will now be described in conjunction to FIGS. 3A to 5C.

The connector 100 will now be described in conjunction with FIGS. 3A to 5C. Specifically, FIG. 3A illustrates a perspective view of the connector 100. FIG. 3B illustrates an inverted perspective view of the connector 100. FIGS. 3C and 3D, respectively, illustrates top and bottom views of the connector of FIG. 3A. FIGS. 4A and 4B, respectively, illustrates enlarged views of a third section of the connector of FIG. 3A with and without a biasing member.

As shown in FIG. 3A, the connector 100 includes a body 110 configured to be received in the opening 310 (as shown in FIG. 2) of the toothbrush head 300. The body 110 includes a first section 112, a second section 118, and a third section 120. The first section 112 includes a flange portion 114 and a stepped circular profile 116. The flange portion 114 extends diametrically, and the stepped circular profile 116 extends diametrically and longitudinally. In one embodiment, the flange portion 114 includes at least one receptacle 114a configured to be engaged with the complementary ridge 312 formed along of the opening 310 of the toothbrush head 300, as shown in FIG. 2.

Further, the second section 118 extends from the first section 112. The second section 118 includes an alternating profile 119 arranged across the second section 118. In one embodiment, the alternating profile 119 of the second section 118 includes a plurality of alternating slots 119a and ridges 119b formed across a portion of the second section 118. In one embodiment, the plurality of alternating slots 119a and ridges 119b are formed in one of a zig-zag pattern or a side-by-side pattern. Specifically, FIGS. 5A and 5B illustrate the plurality of alternating slots 119a and ridges 119b formed in a side-by-side pattern, and FIG. 5C illustrates the plurality of alternating slots 119a and ridges 119b formed in in the zig-zag pattern.

Furthermore, the third section 120 extends from the second section 118. FIGS. 4A and 4B, respectively, illustrates enlarged views of the third section 120 of the connector 100 of FIG. 3A. As shown in FIG. 4B, the third section 120 includes a threaded profile 122, a flexible profile 124, and longitudinal cutouts 127 that separates the flexible profile 124 from the threaded profile 122. In one embodiment, the threaded profile 122 includes threads formed across the third section 120. Further, in one embodiment, the flexible profile 124 includes a flexible member 124a and a rib 124b. The flexible member 124a extends from the seating profile 126, and the rib 124b is formed along a portion of the flexible member 124a.

In one embodiment, each of the first section 112, the second section 118 and the third section 120 include a diametric profile, i.e., may have a thickness extending across a diameter of the connector, and in that the diametric profile of the first section 112 is greater than the second section 118, and the diametric profile of the second section 118 is greater than the third section 120.

The connector 100 further includes a seating profile 126, an aperture 130, and a biasing member 140, as shown in FIGS. 3A and 3B. The seating profile 126 is defined at adjoining of the second section 118 and the third section 120. The aperture 130, as seen in FIG. 3B, is formed inside of the body 110 and extends from the first section 112 to the third section 120. The aperture 130 is configured to receive the drive shaft 410 of the electric toothbrush handle 400. In one embodiment, the aperture 130 includes a diameter that reduces along the length extending from the first section 112 to the third section 120.

Further, the biasing member 140 is received along the third section 120 and rests on the seating profile 126. The biasing member 140 operatively coordinates with the threaded profile and the flexible profile to be diametrically adjusted as per the profiles of the opening 310 of the toothbrush head 300 and the drive shaft 410 of the electric toothbrush handle 400 to snugly couple the toothbrush head 300 with the electric toothbrush handle 400 of the electric toothbrush 200. In one embodiment, the biasing member 140 may be a coil spring where each coil is accommodated in respective threads of the threaded profile 122.

In one embodiment, the connector 100 further includes an apex member 150 above the third section 120. The apex member 150 rests along an end profile of the opening 310 of the toothbrush head 300.

The present disclosure is advantageous in overcoming the shortcomings of the conventional connectors by providing with minimal parts and therefore be cost effective. Further, such connector may be capable of withstanding high-speed vibrations from operating the toothbrush.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, and to thereby enable others skilled in the art to best utilize the present disclosure and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present disclosure.

What is claimed is:

1. A connector for an electric toothbrush to mount a toothbrush head with an electric toothbrush handle of the electric toothbrush, the connector comprising:
   a body configured to be received in an opening of the toothbrush head, the body having:
      a first section having a flange portion extending diametrically, and a stepped circular profile extending diametrically and longitudinally,
      a second section extending from the first section, the second section having an alternating profile arranged across the second section, and
      a third section extending from the second section, the third section having a threaded profile, a flexible profile, and longitudinal cutouts that separates the flexible profile from the threaded profile;
   a seating profile defined at adjoining of the second section and the third section;
   an aperture formed inside of the body and extending from the first section to the third section, the aperture configured to receive a drive shaft of the electric toothbrush handle; and
   a biasing member received along the third section and rests on the seating profile, the biasing member operatively coordinates with the threaded profile and the flexible profile to be diametrically adjusted as per the profiles of the opening of the toothbrush head and the drive shaft of the electric toothbrush handle to snugly couple the toothbrush head with the electric toothbrush handle of the electric toothbrush.

2. The connector as claimed in claim 1, wherein the flange portion comprises at least one receptacle configured to be engaged with a complementary ridge formed along of the opening of the toothbrush head.

3. The connector as claimed in claim 1, wherein the alternating profile of the second section comprises a plurality of alternating slots and ridges formed across a portion of the second section.

4. The connector as claimed in claim 3, wherein the plurality of alternating slots and ridges are formed in one of a zig-zag pattern or a side-by-side pattern.

5. The connector as claimed in claim 1, wherein the threaded profile comprises threads formed across the third section.

6. The connector as claimed in claim 1, wherein the flexible profile comprises:
a flexible member extending from the seating profile, and
a rib formed along a portion of the flexible member.

7. The connector as claimed in claim 1, wherein each of the first section, the second section and the third section comprise a diametric profile, and in that the diametric profile of the first section is greater than the second section, and the diametric profile of the second section is greater than the third section.

8. The connector as claimed in claim 1, wherein the aperture comprises a diameter that reduces along the length extending from the first section to the third section.

9. The connector as claimed in claim 1, wherein the biasing member is a coil spring where each coil is accommodated in respective threads of the threaded profile.

10. The connector as claimed in claim 1 further comprising an apex member above the third section.

11. A toothbrush head for coupling with an electric toothbrush handle of an electric toothbrush, the toothbrush head comprising:
a brush section having a plurality of bristles;
a stem section extending from the brush section, the stem section having an opening; and
a connector to mount the electric toothbrush head with the electric toothbrush handle, the connector comprising:
a body to be received in the opening of the toothbrush head, the body having:
a first section having a flange portion extending diametrically, and a stepped circular profile extending diametrically and longitudinally,
a second section extending from the first section, the second section having an alternating profile arranged across the second section, and
a third section extending from the second section, the third section having a threaded profile, a flexible profile, and longitudinal cutouts that separates the flexible profile from the threaded profile,
a seating profile defined at adjoining of the second section and the third section,
an aperture formed inside of the body and extending from the first section to the third section, the aperture configured to receive a drive shaft of the electric toothbrush handle, and
a biasing member received along the third section and rests on the seating profile, the biasing member operatively coordinates with the threaded profile and the flexible profile to be diametrically adjusted as per the profiles of the opening of the toothbrush head and the drive shaft of the electric toothbrush handle to snugly couple the electric toothbrush head with the electric toothbrush handle of the electric toothbrush.

12. The toothbrush head as claimed in claim 11 further comprising a complementary ridge formed along of the opening of the toothbrush head, wherein the flange portion comprises at least one receptacle configured to be engaged with the complementary ridge.

13. The toothbrush head as claimed in claim 11, wherein the aperture comprises a diameter that reduces along the length extending from the first section to the third section to receive the drive shaft.

14. The toothbrush head as claimed in claim 11, wherein the alternating profile of the second section comprises a plurality of alternating slots and ridges formed across a portion of the second section, and wherein the plurality of alternating slots and ridges are formed in one of a zig-zag pattern or a side-by-side pattern.

15. The toothbrush head as claimed in claim 11, wherein:
the threaded profile comprises threads formed across the third section, and
the flexible profile comprises: a flexible member extending from the seating profile, and a rib formed along a portion of the flexible member.

16. The toothbrush head as claimed in claim 11, wherein the biasing member is a coil spring where each coil is accommodated in respective threads of the threaded profile.

17. The toothbrush head as claimed in claim 11 further comprising an apex member above the third section.

18. An electric toothbrush comprising:
a toothbrush head having a brush section having a plurality of bristles, and a stem section extending from the brush section, the stem section having an opening;
an electric toothbrush handle having a drive shaft; and
a connector comprising:
a body to be received in the opening of the toothbrush head, the body having:
a first section having a flange portion extending diametrically, and a stepped circular profile extending diametrically and longitudinally,
a second section extending from the first section, the second section having an alternating profile arranged across the second section, and
a third section extending from the second section, the third section having a threaded profile, a flexible profile, and longitudinal cutouts that separates the flexible profile from the threaded profile;
a seating profile defined at adjoining of the second section and the third section;
an aperture formed inside of the body and extending from the first section to the third section, the aperture receives the drive shaft of the electric toothbrush handle; and
a biasing member received along the third section and rests on the seating profile, the biasing member operatively coordinates with the threaded profile and the flexible profile to be diametrically adjusted as per the profiles of the opening of the toothbrush head and the drive shaft of the electric toothbrush handle to snugly couple the toothbrush head with the electric toothbrush handle of the electric toothbrush.

19. The electric toothbrush as claimed in claim 18 further comprising a complementary ridge formed along of the opening of the toothbrush head, wherein the flange portion comprises at least one receptacle configured to be engaged with the complementary ridge.

20. The electric toothbrush as claimed in claim 18, wherein the aperture comprises a diameter that reduces along the length extending from the first section to the third section to receive the drive shaft.

\* \* \* \* \*